(12) United States Patent
Mizokuro et al.

(10) Patent No.: US 7,238,460 B2
(45) Date of Patent: Jul. 3, 2007

(54) OPTICAL RECORDING MEDIUM, PRODUCTION METHOD THEREOF AND METHOD OF USING SAME

(75) Inventors: Toshiko Mizokuro, Ikeda (JP); Takashi Hiraga, Ikeda (JP); Noritaka Yamamoto, Ikeda (JP); Hiroyuki Mochizuki, Ikeda (JP); Shin Horiuchi, Tokyo (JP); Norio Tanaka, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 532 days.

(21) Appl. No.: 10/654,605

(22) Filed: Sep. 4, 2003

(65) Prior Publication Data

US 2004/0072100 A1 Apr. 15, 2004

(30) Foreign Application Priority Data

Sep. 4, 2002 (JP) ............................. 2002-259038

(51) Int. Cl.
*G11B 7/24* (2006.01)
*B28B 7/38* (2006.01)

(52) U.S. Cl. ............... 430/270.14; 430/945; 430/321; 430/19; 427/133; 427/255.6; 369/275.2; 428/64.8

(58) Field of Classification Search ............... None
See application file for complete search history.

(56) References Cited

U.S. PATENT DOCUMENTS 4,116,862 A * 9/1978 Wippler ............... 252/586
5,376,511 A * 12/1994 Tatezono et al. ........ 430/270.15

2002/0034705 A1 * 3/2002 Irie et al. ............... 430/270.15

FOREIGN PATENT DOCUMENTS

| CN | 1095734 | * | 11/1994 |
|---|---|---|---|
| EP | 1179558 | * | 3/2000 |
| JP | 62-165649 A | | 7/1987 |
| JP | 2001-189014 A | | 7/2001 |
| JP | 2002-082414 | * | 3/2002 |
| JP | 2003-089269 | * | 3/2003 |
| JP | 2003-094825 A | | 4/2003 |

OTHER PUBLICATIONS

Zielinski et al., "Diffusion of tracer molecules within symmetric diblock copolymers", Macromol. vol. 28 pp. 8287-8294 (1995).*
Mizokuro et al., Molecular doping of photochromic dye into polymer substrates . . . Thin Solid Films, vol. 4999 pp. 1114-1118 (2006).*

* cited by examiner

*Primary Examiner*—Martin Angebranndt
(74) *Attorney, Agent, or Firm*—Oliff & Berridge PLC

(57) ABSTRACT

Disclosed is an optical recording medium, comprising a polymer alloy forming a phase-separated domain structure of a coating object, and a volatile substance interacting with the polymer alloy. The volatile substance in a vapor state is deposited on the surface of specific phase-separated domain, and dispersedly infiltrated into the phase-separated domain. The phase-separated domain and the volatile substance chemically interact with each other. The optical recording medium is operable to perform optical recording by utilizing change in the transmittance, reflectance, refractive index or surface potential thereof in response to irradiation of ultraviolet light, visible light, or infrared light from outside. The present invention can provide an optical recording medium suitable for high-density recording in a wide wavelength range.

6 Claims, 5 Drawing Sheets

OPTICAL RECORDING MEDIUM, PRODUCTION METHOD THEREOF AND METHOD OF USING SAME

CROSS-REFERENCE TO RELATED APPLICATIONS

This application is based upon and claims the benefit of priority from the prior Japanese Patent Application No. 2002-259038, filed Sep. 4, 2002, the entire contents of which are incorporated herein by reference.

FIELD OF THE INVENTION

The present invention relates to an optical recording medium, a method of producing the optical recording medium, and a method of recording, reading and erasing information on the optical recording medium.

BACKGROUND OF THE INVENTION

There have heretofore been used optical thin films of various compositions in a wide range of application fields. In particular, optical thin films utilizing a frequency-selective transmission or reflection based on optical absorption or interference have been known for a long time. Late years, in the fields of optoelectronics and optronics utilizing laser beams, various developments for creating innovative high-performance optical thin films are driven forward to meet the needs of achieving multi-parallel high-speed information processing utilizing optical multiplicity and of obtaining enhanced phenomenon in optical nonlinear effect or opto-electric effect.

An organic optical material is regarded as one of noteworthy materials or compositions thereof for forming such a new high-performance optical thin film. Generally, the organic material has an advantageous feature of allowing a thin film to be readily produced on a large scale through a synthetic process at a reduced cost. In addition, the organic material advantageously provides an extended range of choice of thin film materials.

Lately, the organic material also comes to the front as the material of high-density recording media.

Specifically, an optical recording medium typified by DVD, CD-R or CD-RW has been recently developed with high priority as high-density information-recording media. In particular, a rewritable optical recording material can be used for various purposes because of its repeatability in information writing and erasing, and developments therefor are actively being made.

The mainstream material of available recording media is an inorganic material typified by chalcogenide materials. In a recording medium using these materials, information is recorded thereon in a heat mode. Thus, a desirably increased recording density cannot be practically obtained therein due to inevitable thermal diffusion in the material.

A specific organic compound, so-called photochromic material, has a property in which its molecular structure is changed through a photoisomerization reaction caused by absorbing a specific light while creating an additional optical absorption capacity (mainly in a visible region), and the photoisomerized material is returned to its original structure through a reverse reaction caused by absorbing a different light. Thus, the photochromic material is expected as a new material of optical recording media for recording, reading and erasing information in a photochemical process (photon mode) including no thermal effect. In the photochromic recording media, information is recorded in a molecular level through photoreaction, molecule, and the photochromic molecule itself has a potential for providing high resolution. Further, a stable molecular material such as diarylethene-based materials can be used to allow even an extremely small record mark to be recorded without instability. Therefore, the photochromic material would be considered as an optimal material of super-high-density recording media using a near-field light (evanescent light).

The inventors proposed an optical recording medium production method using an organic compound, wherein a volatile substance is dispersed in a specific polymer having an affinity to the volatile substance molecules at a high concentration while maintaining a specific function of the volatile substance molecules (see the following Nonpatent Literature-1 and Patent Publications 1 to 3).

[Nonpatent Literature-1]
T. Hiraga, G Chen, K. Tsujita, N. Tanaka, Q. Chen and T. Moriya, A Novel Formation Method of Thin Polymer Film with Densely Dispersed Organic Dye by using Vacuum Technique, "Molecular Crystals and Liquid Crystals", Gordon and Breach Science Publishers (New York), published 2000, Vol. 344, page 211.

[Patent Publication-1]
Japanese Patent Laid-Open Publication No. 2000-256877

[Patent Publication-2]
Japanese Patent Laid-Open Publication No. 2000-281821

[Patent Publication-3]
Japanese Patent Laid-Open Publication No. 2001-026884

In application of a functional organic compound such as photochromic compounds to an optical recording medium, it is required to disperse or infiltrate organic compound molecules in a macromolecule or silica gel-like matrix at a high concentration. This process has been performed using a spin coating method in many cases.

While there are various wet-type thin film forming processes using solution, dispersion liquid or developer, for example, a coating method such as spin coating, roll coating, dipping or spraying; a printing method such as planographic printing, relief printing, intaglio printing, stencil printing, screen printing or decalcomania; an electrochemical technique such as electrodeposition process, electrolytic polymerization process or micelle electrolytic process; and a Langmuir projecting process of transferring a monomolecular film formed on the water surface, it is extremely difficult to form a polymer film having functional organic compound molecules while maintaining its homogeneity, using these processes. Further, if it is attempted to disperse organic compound molecules at a high concentration, the organic compound molecules will agglutinate, resulting in disappearance of a specific property of the organic compound molecules.

The conventional optical recording medium also has a problem of deterioration in recording accuracy caused by increased recording density.

SUMMARY OF THE INVENTION

In view of the above problems, it is therefore an object of the present invention to an optical recording medium capable of stably holding volatile functional organic compound molecules typified by photochromic molecules in a specific structural domain of a matrix, while maintaining a specific function of the compound molecules to provide enhanced optical response, and usable in a photon mode.

It is another object of the present invention to provide a method of producing the optical recording medium.

It is still another object of the present invention to provide a method of recording, reading and erasing information on the optical recording medium.

In order to achieve the above objects, according to a first aspect of the present invention, there is provided an optical recording medium having a surface layer which serve as a recording layer and comprises a composition containing a polymer with a phase-separated structure of two or more kinds of phase-insoluble polymer components each having a size of 10 to 100 nm. Each of one or more kinds of phase-separated domains in the phase-separated structure constitutes a basic unit for optical recording. The phase-separated domains include one or more kinds of specific volatile substances dispersed therein in a one-to-one correspondence with each other. The specific volatile substances is formed by homogeneously depositing the specific volatile substances in a vapor state on the respective surfaces of the specific phase-separated domains in a one-to-one correspondence with each other, and dispersedly infiltrating the deposited specific volatile substances into the corresponding specific phase-separated domains.

According to a second aspect of the present invention, there is provided a method of producing an optical recording medium, comprising the steps of: forming a surface layer which serves as a recording layer and comprises a composition containing a polymer with a phase-separated structure of two or more kinds of phase-insoluble polymer components each having a size of 10 to 100 nm; homogeneously depositing one or more kinds of specific volatile substances in a vapor state on the respective surfaces of one or more kinds of specific phase-separated domains in the phase-separated structure, in a one-to-one correspondence with each other; dispersedly infiltrating the deposited specific volatile substances into the corresponding specific phase-separated domains; and allowing the specific phase-separated domains and the corresponding specific volatile substances to chemically interact with each other.

According to a third aspect of the present invention, there is provided a method of recording, reading and erasing information on the optical recording medium as set forth in the first aspect of the present invention, wherein the information is recorded, read and erased by irradiating the recording medium with a near-field light, and the volatile substance has at least one of a light transmittance, a light reflectance and a refractive index and a dipole moment which are changed in response to the irradiation of a light selected from the group consisting of an ultraviolet light, a visible light and a near-infrared light, wherein the information is recorded, read and erased by irradiating the recording medium with the light, in an photochemical process including no thermal effect.

DESCRIPTION OF THE PREFERRED EMBODIMENT

Figure 1:
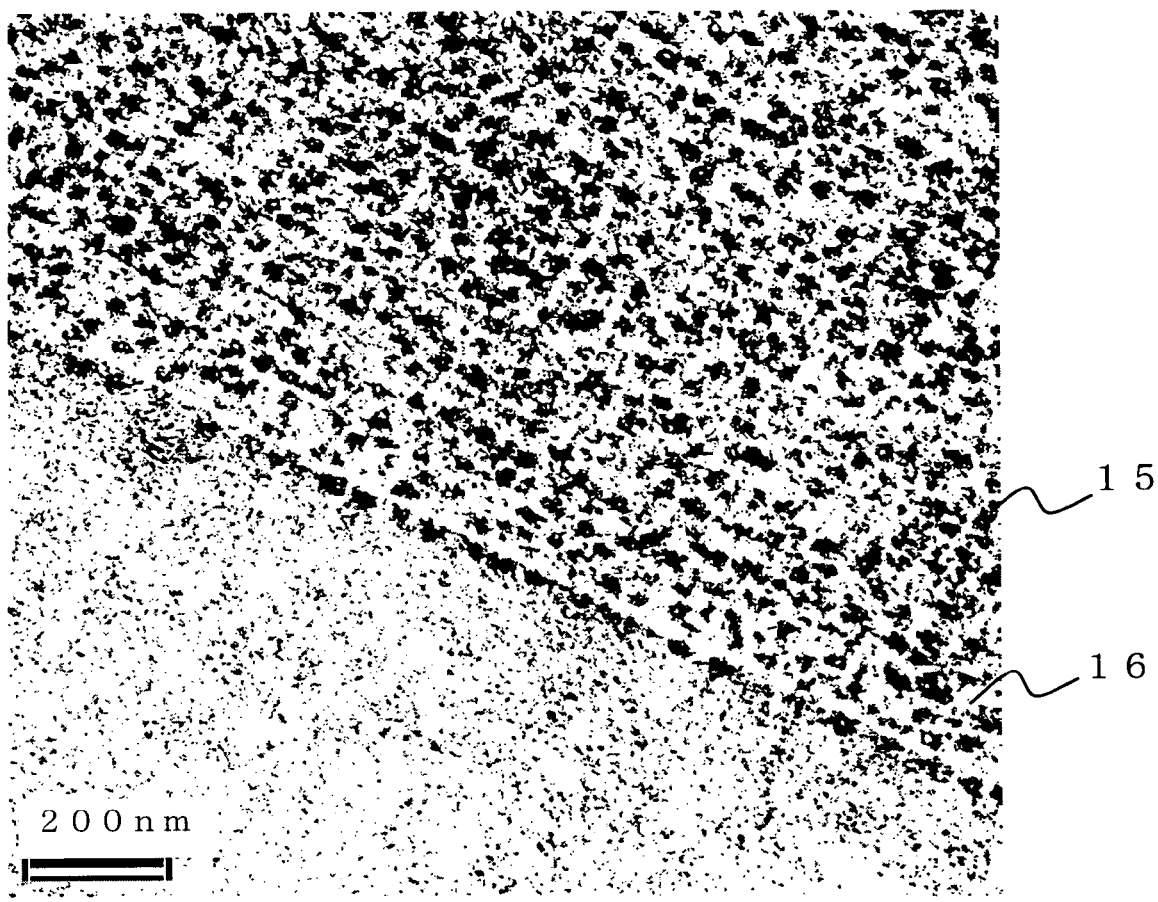
FIG. 1 is a photomacrograph showing the surface of an optical recording medium produced in Example-1 observed under a transmission electron microscope (TEM).

A polymer alloy, or a mixture of two or more kinds of macromolecules, usable as an information-recording layer in the present invention has a phase-separated structure in nanometer to micrometer scale, because most of the macromolecules are phase-insoluble with each other. Among polymer alloys, a block copolymer or graft copolymer including two or more kinds of macromolecules bonded by the end or side chain, particularly having a phase-separated structure with a size equivalent to the molecular size of macromolecule and with a long period, is preferably used in the present invention. The block copolymer or graft copolymer is formed as a thin film having a structure with orderly arranged phase-separated domains constituting the surface of the thin film. Further, the sizes of and the intervals between the phase-separated domains can be controlled by adjusting the molecular weight and molecular weight ratio of the block copolymer or graft copolymer. The sizes of and the intervals between the phase-separated domains can also be adjusted by adding macromolecules phase-soluble with the macromolecules constituting the block copolymer or graft copolymer. An optical recording layer can be efficiently produced by forming a thin film using a polymer alloy, and selectively infiltrating a volatile substance into the thin film.

In the present invention, the specific components of the polymer alloy may include polymethyl-methacrylate, polyethyl-methacrylate, polycyclohexyl-methacrylate, polyhydroxyethyl-methacrylate, poly (2-hydroxypropyl-methacrylate), polystyrene, poly (4-methylstyrene), poly (t-butylstyrene), polybutyl-methacrylate, polyisopropyl-methacrylate, poly (t-butyl-methacrylate), polybenzyl-methacrylate, polyphenyl-methacrylate, and polypropyl-methacrylate.

The inventors found that volatile substances in a vapor state can be brought into contact with the polymer ally to infiltrate specific one of the volatile substances into a vapor state only in specific one of the phase-separated domains, or the n-th volatile substance can infiltrate into the n-th phase-separated domain of the polymer alloy exposed to the n-th volatile substance in a vapor state, with high selectivity (wherein n is an integer number in the range of 1 to 20). The selectivity herein is evaluated by comparing the concentration of the n-th volatile substance infiltrating into the n-th phase-separated domain to the concentration of the n-th volatile substance infiltrating into the remaining phase-separated domains other than the n-th phase-separated domain. For example, instead of the polymer alloy, pellets (cylindrical shape, outer diameter: about 2.5 mm, length: 2.5 mm) of polymethyl-methacrylate, poly (4-methylstyrene) and poly (2-hydroxypropyl-methacrylate) were disposed adjacent to each other in a closed glass tube, and the vapor of aluminum quinolinate (hereinafter referred to as "Alq3" by brevity) was brought into contact with these pellets at 180° C. for 48 hours. As a result, the concentration of Alq3 infiltrating from the surface of the pellet of poly (4-methylstyrene) into a depth of 1 µm was five or more times greater than that of Alq3 infiltrating from the respective surfaces of the remaining two pellets into a depth of 1 µm. Further, under the same conditions except for using the vapor of 4-(dicyanomethylene)-2-methyl-6 (4-dimethylamino styryl)-4H-pyran (hereinafter referred to as (DCM) by brevity) as a substitute for the vapor of Alq3, and treating at 120° C. for 24 hours, the levels of the infiltration of DCM into the respective surfaces of the three kinds of pellets were compared with each other. As a result, the concentration of DCM infiltrating from the surface of the pellet of polymethyl-methacrylate into a depth of 1 μm was five or more times greater than that of DCM infiltrating from the respective surfaces of the remaining two pellets into a depth of 1 μm. From the above preliminary test results, it is proved that, in the three-component-base polymer alloy (domain size: 10 to 1000 nm) having a matrix of poly (2-hydroxypropyl-methacrylate) and two domains of polymethyl-methacrylate and poly (4-methylstyrene), a polymer alloy thin film in which Alq3 and DCM infiltrate selectively into the domain of poly (4-methylstyrene) and the domain of polymethyl-methacrylate, respectively, can be produced by bringing the vapor of Alq3 into contact with the polymer alloy at 180° C. for 48 hours and then bringing the vapor of DCM into contact with the polymer alloy at 120° C. for 24 hours.

If a volatile substance in a liquid state is directly bought into contact with the polymer alloy, the homogeneity of the polymer alloy thin film will be undesirably deteriorated, or it will be difficult to selectively infiltrate the volatile substance into a specific polymer. Thus, it is desired to volatilize and gasify a volatile substance under atmosphere or vacuum pressure and then bring the volatile substance in a vapor state into contact with the surface of the polymer alloy. The polymer alloy may be heated up to provide an enhanced selectivity and the increased speed of the infiltration.

When the polymer alloy is disposed in a closed container capable of controlling the pressure and temperature thereof, and a volatile substance is brought into contact with the polymer alloy, it is required to control the temperature below its upper limit or the melting point of the composition, and the pressure in the container below the saturated vapor pressure of the volatile substance.

The infiltration level of a volatile substance from the polymer alloy can be controlled by adjusting the exposure time to the volatile substance in a vapor state, the temperature, and the pressure. In using the thin film as an optical recording media, the depth of the infiltration is necessary to be in the range of 1 to 2000 nm, preferably 10 to 100 nm. As disclosed in the aforementioned Nonpatent Literature-1 and Patent Publications-1 to 3, the above optical recording medium production method is also characterized in that a volatile substance can be dispersed in a specific polymer having an affinity with the volatile substance molecules while maintaining a specific function of the volatile substance molecules.

The volatile substance in the present invention may include a photochromic compound, such as a diarylethene-based compound, a fulgide-based compound, an azobenzene-based compound, a spiropyran-based compound, a spirobenzopyran-based compound, a spirooxazine-based compound, spirothiopyran-based compound, a thioindigo-based compound. A specific example of a sublimable crystalline organic compound capable of causing a photochromic phenomenon may include: spiropyrans, such as 6-bromo-1',3'-dihydro-1',3',3'-trimethyl-8-nitrospiro[2H-1-benzopyran-2,2'-(2H)-indole], 5-chloro-1,3-dihydro-1,3,3-trimethylspiro[2H-indole-2,3'-[3H]naphth [2,1-b]-[1,4]oxazine], 5-chloro-1,3dihydro-1,3,3-trimethylspiro[2H-indole-2,3'-[3H]phenanthr-[9,10-b][1,4]oxazine], 6,8-dibromo-1 ',3'-dihydro-1',3',3'-trimethylspiro[2H-1-benzopyran-2,2'-(2H)indole], 1',3'-dihydro-1',3',3'-trimethyl-6-nitrospiro[2H-1-benzopyran-2,2'-(2H)-indole], 1',3'-dihydro-5'-methoxy-1',3',3'-trimethyl-6-nitrospiro[2H-1-benzopyran-2,2'-(2H)-indole], 1',3'-dihydro-8-methoxy-1',3', 3'-trimethyl-6-nitrospiro[2H-1-benzopyran-2,2'-(2H)-indole], 1,3-dihydro-1,3,3-trimethylspiro[2H-indole-2,3'-[3H]naphtho [2,1-b][1,4]oxazine], 1,3-dihydro-1,3,3-trimethylspiro[2H-indole-2,3'-[3H]phenaphtho [9,10-b][1, 4]oxazine], 1,3-dihydro-1,3,3-trimethylspiro[2H-indole-2, 3'-[3H]naphtho[2,1-b]pyran], 1,3-dihydro-5-methoxy-1,3,3-trimethylspiro[2H-indole-2,3'-[3H]naphtho[2,1-b]pyran]; fulgide, such as 2-5-dimethyl-3-furylethylidenesuccinic anhydride, 2-5-dimethyl-3-furylisopropylidenesuccinic anhydride; and diarylethenes, such as 2,3-bis (2,4,5-trimethyl-3-thienyl) maleate anhydride, 2,3-bis (2,4,5-trimethyl-3-thienyl) maleimide, cis-1,2-dicyano-1,2-bis (2,4,5-trimethyl-3-thienyl) ethene.

The photochromic compound has a property peculiar to molecule, in which its physical property, such as transmittance/reflectance and refractive index with respect to light, or dipole moment, is changed through a photoisomerization caused by absorbing a specific light, and the photoisomerized state is returned to its original state by irradiating it with a light different from the above light. Thus, the photochromic compound is one of desirable materials as the volatile substance in the present invention. As one example of the photochromic compound, the chemical structure of cis-1,2-dicyano-1,2-bis(2,4,5-trimethyl-3-thienyl)ethene (hereinafter referred to as "CMTE" by brevity) which is one of diarylethene dyes will be shown below.

[Chemical Structure 1]

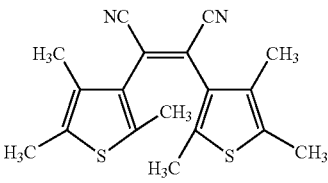

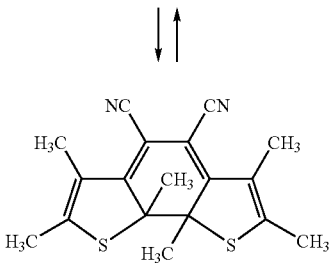

Figure 2:
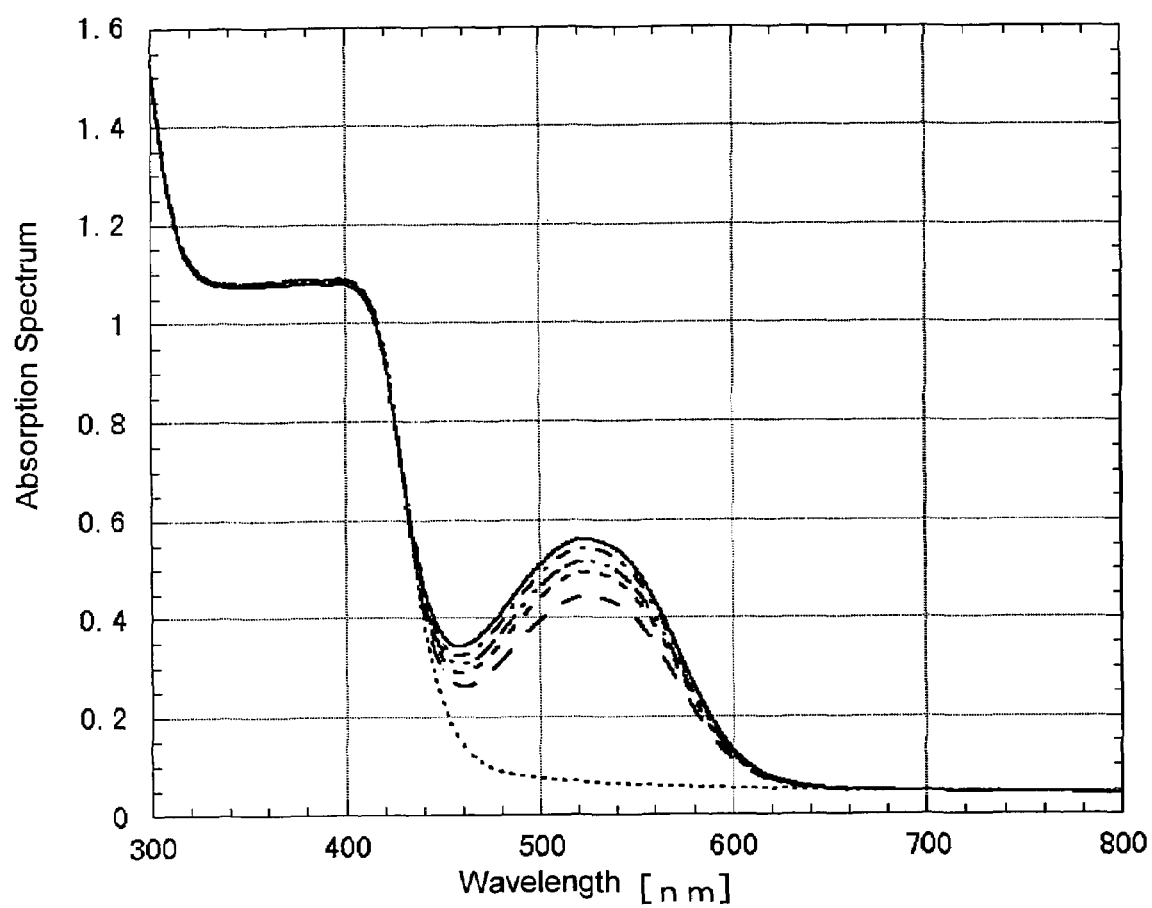
FIG. 2 is a diagram showing an absorption spectrum when a photochromic dye CMTE is irradiated with a visible light having a wavelength cut off in the range of 400 nm or more.

For example, a polycarbonate resin thin film dyed by CMTE is changed in color, specifically changed to yellow by irradiating it with a light having a wavelength of 400 nm to 620 nm and to auburn by irradiating it with a light having a wavelength of less than 400 nm. The thin film changed to yellow by irradiating it with a light having a wavelength of 400 to 620 nm for 20 minutes was irradiated with a black light or visible light having a wavelength cut off in the range of 400 nm or more (center wavelength: 366 nm), for 2, 4, 6, 8 and 10 hours, and the change of absorption spectrum was measured. This result is shown in FIG. 2. In this figure, a spectrum after 20 minutes since the irradiation of the first light having a wavelength of 400 to 620, a spectrum after 2 hours since the irradiation of the second light having a wavelength cut off in the range of 400 nm or more, a spectrum after 4 hours since the irradiation of the second light, a spectrum after 6 hours since the irradiation of the second light, a spectrum after 8 hours since the irradiation of the second light and a spectrum after 10 hours since the irradiation of the second light are indicated by a broken line, a long chin line, a short chain line, a two-dot chain line, a one-dot chain line, and a solid line, respectively.

While the molecule in an open ring state as shown in the upper side of above chemical formula has no absorption in a visible range, the molecule in a closed ring state as shown in the lower side has an absorption in the visible region (530 nm). Thus, an information recording operation can be achieved, for example by bringing the entire surface of an optical recording medium in the open ring state, and then irradiating the surface with a He—Cd laser light having a wavelength of 325 nm to bring a certain molecule into the closed ring state. Alternatively, this operation may be performed by using the open ring state and the closed ring state as the recorded state and the non-recorded state, respectively.

Some photochromic compounds have a problem that when a light is irradiated to detect the change in property due to photoisomerization, a reverse reaction gradually proceeds even if the light has a low intensity. For example, this problem can be solved by utilizing the following property of photochromic molecules.

When diarylethene is used as one example of photochromic molecules, its open ring structure is photoisomerized into a closed ring structure by irradiating the diarylethene with a specific light. The closed ring structure is also photoisomerized into the open ring structure by irradiating the diarylethene with another light having a specific wavelength. When the diarylethene absorbs a photon, its molecule is exited from a base state to an excited state, and the hole and electron of the excited molecule are separated from each other. If any electric field exists, the electron and hole will be pulled by positive and negative electrodes, respectively, to immediately return the molecule to the base state. The electric carriers, such as the electron and hole pulled toward the electrodes, becomes current in the electrodes, and this current can be picked up outside. Since the current value is varied depending on the photoisomerized state, the photoisomerized state can be checked by detecting the current, as disclosed in Japanese Patent Laid-Open Publication No. 2002-082414. Further, if the diarylethene is dispersed in the polymer, the photoisomerized state can be observed as the change in potential of the surface of the polymer using a surface potential microscope or the like. Specifically, a metallic electrode such as an aluminum electrode is arranged between a glass or polymer substrate and a polymer alloy layer including diarylethene dispersed in a specific phase-separated domain. Then, the surface of the polymer alloy can be scanned while applying a voltage of 0.1 to 10V, preferably 1 to 5 V, between the metal electrode and a probe of the surface potential microscope to observe the photoisomerized state of the diarylethene dispersed in the phase-separated domain.

Further, in the diarylethene, a closed ring structure provides a higher refractive index than that in an open ring structure. Thus, an image of a phase-separated domain of a polymer alloy having a columnar shape perpendicular to the surface of a substrate can be observed by dispersing diarylethene in the phase-separated domain to provide a core/clad structure as in a light waveguide utilizing the difference in refractive index between the phase-separated domain having the diarylethene dispersed therein, and the matrix, and propagating a light having a wavelength, preferably 620 nm or more, preventing the diarylethene from causing a photochromic reaction therein, through the phase-separated domain of the polymer alloy, including the diarylethene dispersed therein and serving as the core. The respective structures of the polymer layer and the diarylethene is arranged such that the difference in refractive index between the phase-domain having the diarylethene dispersed therein and matrix is in the range of 0 to 0.02, preferably 0 to 0.06 in the open state, in the state of 0.06 or more, preferably 0.15 or more in the closed state. Alternatively, the structures of the polymer layer and the diarylethenethe may be arranged to propagate light in the open state of the diarylethene.

In a transmission-type optical recording medium configured to allow a signal light (probe light) to transmit therethrough, the optical recording medium of the present invention may have the most fundamental structure having an optical recording layer which includes the polymer alloy infiltrated with a volatile material, and a light transmittable substrate (e.g. polycarbonate resin substrate or glass substrate). This fundamental structure may further include a protective layer, an anti-oxidation layer and an over coat layer.

In a reflection-type optical recording medium adapted to detect a signal light (probe light) reflected after transmitting therethrough, the optical recording medium of the present invention may have the most fundamental structure having a substrate, light reflection layer and an optical recording layer. This fundamental structure may also include a protective layer, an anti-oxidation layer and an over coat layer. Preferably, the light reflection layer is made of a metal material having high reflectance, such as aluminum, aluminum/chromium alloy, aluminum/titanium alloy, silver and gold, and formed through a vapor deposition method or sputtering method using the above metal material.

The optical recording medium may have a thickness of 20 to 500 nm. If a head having an opening and serving as a recording/reproducing head for irradiating the optical recording layer with light, in information recording/reproducing operations, the optical recording medium preferably has a thickness less than the opening diameter of the above recording/reproducing head. A metal thin film serving as the above optical reflection film has a property excellent in adhesion to both a glass material and a polymer material, and thereby optical recording layer can have excellent adhesion while maintaining its intended functions.

In recording and reading information to and from the optical recording medium of the present invention, it is preferable to use a leaser beam or near field light (evanescent light) condensed by a condensing lens. This is also advantageous to provide enhanced recording density. The light from the light source may be any one of an ultraviolet light, visible light and infrared light, which have a wavelength capable of allowing the light to transmit through a light transmittable substrate, and allowing the optical recording layer to be changed in transmittance/reflectance or refractive index.

The recording operation of recording information on the optical recording medium of the present invention is performed as follows. A condensed record-writing light (leaser light or evanescent light) is focused on and emitted to a specific one of a plurality of polymer-alloy phase-separated domains each having an volatile substance such as photochromic compounds selectively dispersed therein, and the refractive index, transmittance and reflectance to the light incident into the specific domain, or the surface potential in the specific domain is changed in response to the incident light. This domain serves as a pit for representing a record. In order to prevent the record from being erasing, the reading operation is performed by using a light (laser light, evanescent light) of a wavelength incapable of erasing the record (see Example-3 described later), or by observing or measuring the change of the surface potential (see Example-2 described later). The record erasing operation is performed by irradiating the specific domain with a record erasing light (laser light, evanescent light). In particular, when an evanescent light is used, an extremely small mark of several 10 nm can be used as a signal for the writing or reproducing operations, beyond the light diffraction limit, by irradiating a recording medium with a recording or reproducing light while reducing the distance between an optical head and the recording medium to several 10 nm through the use of a probe with fine apertures having a size of the wavelength or less of the light, or solid immersion lens.

EXAMPLE

The present invention will be described in conjunction with specific examples. It is understood that the present invention is not limited to such specific examples, but the scope of the present invention should be determined by the appended claims and their legal equivalents.

Example-1

Figure 3:
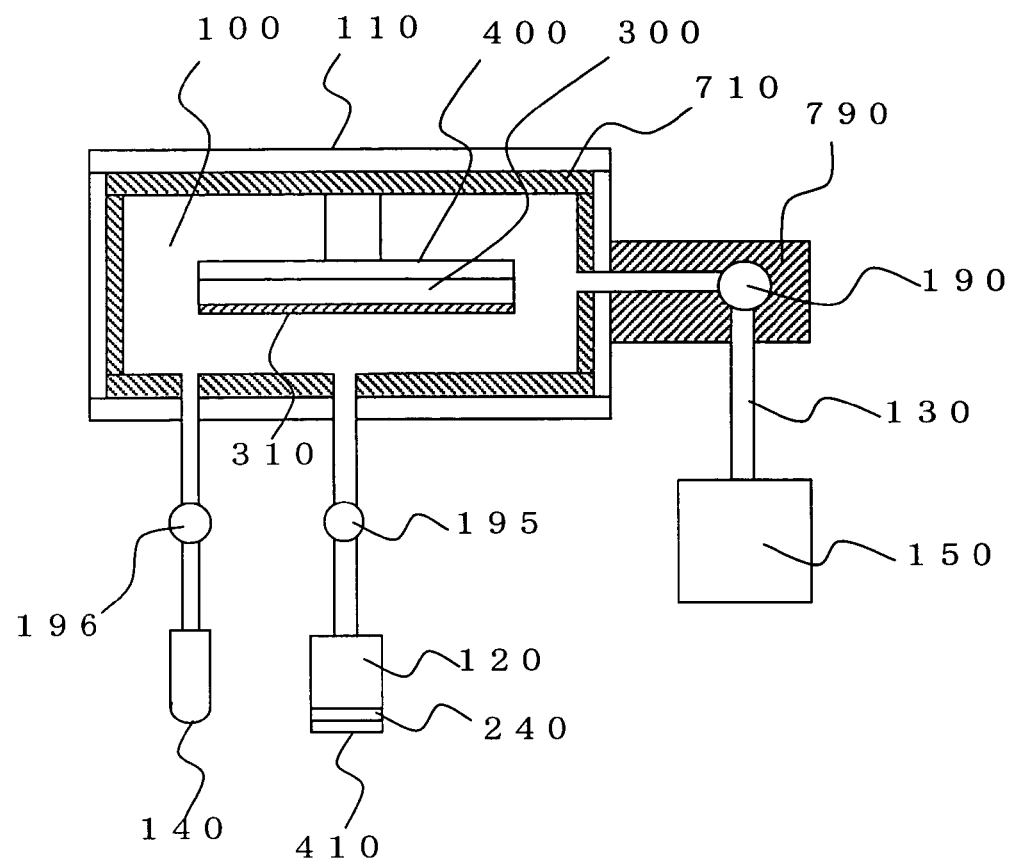
FIG. 3 is a schematic sectional view showing an optical recording medium production apparatus used in an optical recording medium production method in Example-1.

FIG. 3 is a schematic sectional view showing an optical recording medium production apparatus used in this example. On a doughnut-shaped glass substrate 300 having a thickness of 1.2 mm, an outer diameter of 120 mm and an inner diameter of 15 mm, a polymer alloy thin film with phase-separated domains (polystyrene: polymethyl-methacrylate=30:70, thickness: 500 nm, diameter of phase-separated domain: 50 μm) 310 was formed through a spin coating method, and the thin film was set in a first closed container 110. A photochromic dye which is in solid state at 25° C., cis-1,2-dicyano-1,2-bis (2,4,5-trimethyl-3-thienyl) ethene (hereinafter referred to as "CMTE" by brevity) was used as a volatile substance, and CMTE was set in a second closed container 140. If a volatile substance is in liquid state at 25° C., it may be infiltrated into a porous sponge to prepare a vapor source 240 (urethane sponge: for example, thickness: 5 mm, width: 10 mm, length: 40 mm), and the vapor source 240 may be set in a third another closed container 120. The first closed container 110 is in fluid communication with the third closed container 120 through a valve 195, and with the second closed container 140 through a piping and a valve 196. The first closed container 110 containing the substrate 300 has an outer wall made of stainless steel or aluminum, and formed as a separatably structure for taking in and out the substrate (not shown). The inner space 100 of the first closed container 110 is in fluid communication with a vacuum pumping system 150 through a vacuum valve 190 and a vacuum pipe 130. The vacuum pumping system 150 is operated to evacuate air from the first closed container 110 under room temperature until the first closed container 110 has an inner pressure of $10^{-4}$ Pa, and then the vacuum valve 190 is closed to hermetically seal the first closed container 110.

A vapor source heater 410, a resin substrate heater 400 and a vacuum valve 790, which are used as heating means, may be composed, for example, of a heater comprising an aluminum body with a sheathed hot wire embedded therein. These heaters may be made of material having high heat conductivity and arranged to sufficiently cover the corresponding object, so as to allow the inner space of the third close container 120, the vacuum valve 190 and others to be homogeneously heated.

In this example, a case of using CMTE as a volatile substance will be described in more detail.

The inner space 100 of the first closed container 110 was depressurized, and heated by the heating means of the resin substrate heater 400 and a heater 710 to control the entire temperature at 100° C. The second closed container 140 hermetically containing CMTE was also heated by heating means (not shown), up to 110° C. which is higher than the setting temperature of the first closed container 110 containing the substrate 300/polymer alloy 310. Then, the valve 196 for providing fluid communication between the first and second closed containers 110, 140 was opened, and each of the containers 110, 140 was maintained at their setting temperature for 3 hours. Then, the respective inner temperatures of the first and second closed containers 110, 140 were gradually reduced to 25° C. Then, the inner space 100 of the first closed container was returned to atmospheric pressure, and the substrate 300/polymer alloy 310 was taken out of the first closed container.

If a compound in liquid state at 25° C. is used as a volatile substance, the above description on the heating means can be read by replacing the valve 196 with the valve 195, and replacing the second closed container 140 with the third closed container 120. That is, the same substrate 300/polymer alloy 310 as that described above can be obtained by heating the third closed container 120 with the vapor source heater 410. The obtained substrate 300/polymer alloy 310 was processed into samples for observation with a transmission electron microscope (TEM) through a conventional method. FIG. 1 shows the observation result using a transmission electron microscope with an energy filter, under cooling with liquid nitrogen. In FIG. 1, while the phase-separated domain 15 (diameter: about 50 nm) composed of polystyrene of the polymer alloy 310 was dyed in black color due to the image of sulfur atom contained in CMTE, the matrix 16 composed of polymethyl-methacrylate was not dyed at all. Thus, it was verified that CMTE homogeneously infiltrates only into the polystyrene region corresponding to the phase-separated domain having a diameter of 50 nm. In the measurement result of the average surface roughness (Ra) of the polymer alloy 310 in the observation using an atomic force microscope (AFM), Ra was 1 nm or less, which proves that the flatness is adequately maintained. Thus, it was verified that a homogeneous optical recording medium can be produced through the above production method.

The optical recording operation was carried out as follows. A light from a halogen lump was filtered through a long-wavelength transmission filter (Toshiba Glass:V-Y44) to cut off the wavelength of less than 400, and then irradiated on the entire surface of the optical recording medium for 5 minutes to photoisomerize the entire CMTE of the polystyrene into the open ring structure. Then, a He—Cd laser light of 325 m wavelength was selectively emitted from the front end of an open-type near-field optical microscope probe having an opening of 80 nm, to irradiate a specific domain of about 50 nm diameter composed of polystyrene for 1 minute, so as to photoisomerize CMTE from the open ring structure to the closed ring structure. Then, the absorbance at 530 nm wavelength was measured by scanning an Ar laser light of 488 nm wavelength along the surface of the polymer alloy while emitting the Ar laser light from the front end of the above near-field optical microscope probe at a laser light intensity which was $\frac{1}{200}$ of that in the above He—Cd laser light. As a result, the surface of the polymer alloy had a recorded spot of about 50 nm diameter caused by the absorption of the closed ring structure of CMTE. In the same way, the absorbance at 530 run wavelength was measured by selectively emitting the Ar laser light of 488 nm wavelength from the front end of the above near-field optical microscope probe to the above spot at the same laser light intensity as that in the above He—Cd laser light for 2 minutes. As a result, the above spot was not observed because of the photoisomerization of the closed ring structure of CMTE to the open ring structure.

It was also verified that this optical recording medium can perform the optical recording/reading/erasing operations through the above method even under a high-temperature/high-humidity condition wherein a temperature of 90° C. and a humidity of 80% were held for 300 hours.

Example-2

Figure 4:
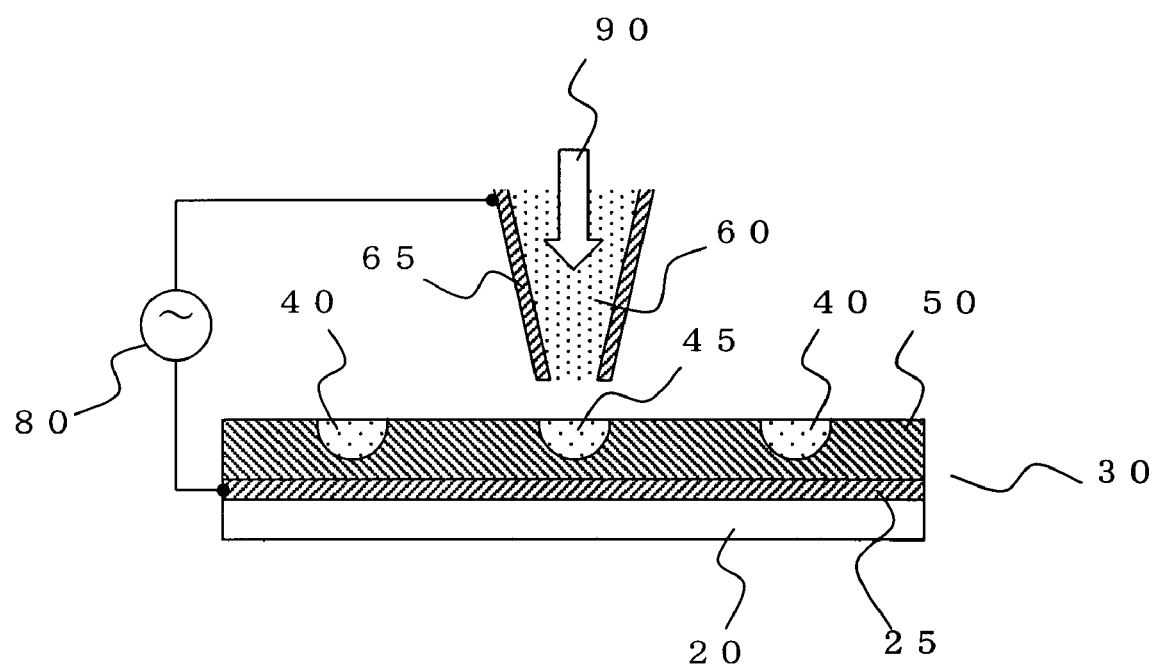
FIG. 4 is a schematic sectional view showing an information recording/reading/erasing method in Example-2.

As shown in FIG. 4, on a doughnut-shaped glass substrate 20 having a thickness of 1.2 mm, an outer diameter of 120 mm and an inner diameter of 15 mm, a metal electrode layer 25 (aluminum) was formed at a thickness of 500 nm, and a polymer alloy thin film 30 (poly (4-methylstyrene):polyhydroxyethyl-methacrylate=30:70, thickness: 500 nm, diameter of phase-separated domain: 50 nm) was formed on the metal electrode layer 25 through a spin coating method. Using the same method as in Example-1, the entire inner space 100 of the first closed container 110 in FIG. 3 was heated up to 80° C., and the second closed container 140 hermetically containing CMTE was also heated up to 100° C. The first and second closed containers were maintained at the above temperatures for 10 hours to produce an optical recording medium having CMTE selectively dispersed only in the poly (4-methylstyrene). A light from a halogen lump was filtered through a long-wavelength transmission filter (Toshiba Glass:V-Y44) to cut off the wavelength of less than 400, and then irradiated on the entire surface of the polymer alloy thin film 30 for 5 minutes to photoisomerize the entire CMTE of the poly (4-methylstyrene) into the open ring structure. Then, an AC power source 80 was connected between the metal electrode 25, and a near-field optical microscope probe 60 having an electrode 65 formed by coating aluminum on the outer peripheral surface of the front end thereof at a thickness of 500 nm, and the surface of the polymer ally 30 was scanned by the probe 60 as a surface potential microscope probe, using the process disclosed in Literature "H. Yokoyama, et at., Mol. Electronics Bioelectronics, Vol. 3, page 79 (1992), M. Fujiihira, et al., Chem. Lett., page 2223 (1992)], while applying 1V of voltage between the probe 60 and the metal electrode layer 25 to detect a surface potential without deterioration in resolution. As a result, no image due to the phase-separated domain 40 composed of poly (4-methylstyrene) was observed. Then, a He—Cd laser light 90 of 325 nm wavelength was selectively emitted from the front end of a near-field optical microscope probe 60 to irradiate a specific domain 45 of poly (4-methylstyrene) for 1 minute, so as to photoisomerize CMTE in the domain 45 from the open ring structure to the closed ring structure. The surface of the polymer alloy 30 was scanned by the probe 60 while applying 1V of voltage between the metal electrode layer 25 and the near-field optical microscope probe 60 to allow the prove 60 to scan as a surface potential microscope probe using the above process. As a result, only an image of the domain 45 caused by the change in surface potential therein was observed. That is, the change of the surface electrode of the domain 45 due to photoisomerization could be observed. Further, CMTE in the domain 45 was photoisomerized from the closed ring structure to the open ring structure by selectively emitting the Ar laser light 90 of 488 nm wavelength from the front end of the near-field optical microscope probe 60 to the domain 45. Then, the surface of the polymer alloy 30 was scanned by the probe 60 while applying 1V of voltage between the aluminum layer 25 and the near-field optical microscope probe 60 to allow the prove 60 to scan as a surface potential microscope probe using the above process. As a result, no image of the domain 45 was observed. In this example, the information recording/erasing operation could be achieved by using the prove 60 as a near-field optical microscope probe, and the information reading operation could also be achieved without returning CMTE to the open ring structure by measuring the change of the surface potential using the prove 60 as a surface potential microscope probe.

Example-3

Figure 5:
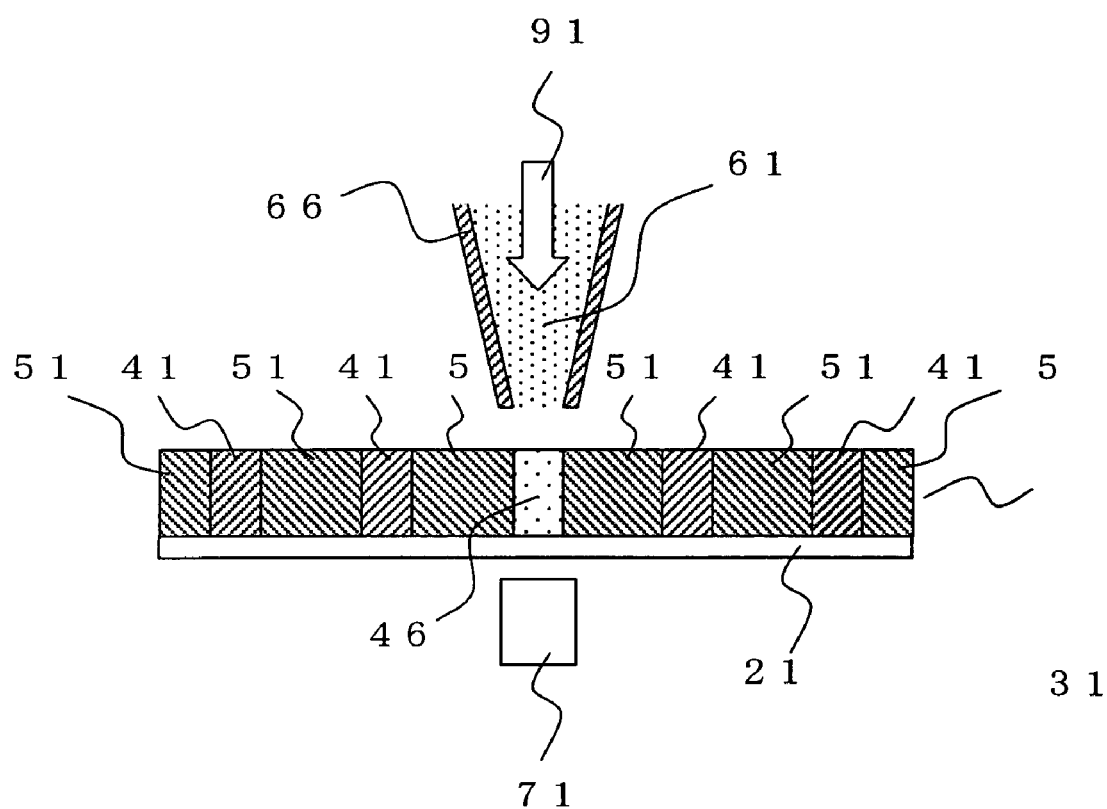
FIG. 5 is a schematic sectional view showing an information recording/reading/erasing method in Example-3.

As shown in FIG. 5, on a doughnut-shaped glass substrate 21 having a thickness of 1.2 mm, an outer diameter of 120 mm and an inner diameter of 15 mm, a polymer alloy 31 (polybenzyl-methacrylate:polyphenyl-methacrylate=30:70, thickness: 100 nm, diameter of phase-separated domain: 50 nm) with a columnar phase-separated domain structure perpendicular to the surface of the above substrate was formed through a spin coating method. Using the same method as in Example-1, the entire inner space 100 of the first closed container 110 in FIG. 3 was heated up to 75° C., and the second closed container 140 hermetically containing CMTE was also heated up to 100° C. The first and second closed containers were maintained at the above temperatures for 15 hours to produce an optical recording medium having CMTE homogeneously dispersed only in a phase-separated domain 41 composed of polybenzyl-methacrylate. When CMTE in the open ring structure was dispersed in polybenzyl-methacrylate ($n_0$=1.5680), the refractive index of polybenzyl-methacrylate was increased by 0.0070, which was greater than that of polyphenyl-methacrylate ($n_0$=1.5706). A light from a halogen lump was filtered through a long-wavelength transmission filter (Toshiba Glass:V-Y44) to cut off the wavelength of less than 400, and then irradiated on the entire surface of the polymer alloy 31 for 5 minutes. Then, the front end of a near-field optical microscope probe 61 was moved close to the surface of the polymer alloy while entering into the probe 61 a light 91 of 780 nm, which is in a near-infrared region causing no photoisomerization reaction in CMTE, so as to observe the surface of the polymer alloy 31 including the domain 46 using a detector 71. No signal was observed. Then, a He—Cd laser light 91 of 325 nm wavelength was selectively emitted from the front end of the near-field optical microscope probe 61 to irradiate a specific domain 46 of polybenzyl-methacrylate for 1 minute, so as to photoisomerize CMTE from the open ring structure to the closed ring structure. The near-field optical microscope probe 61 received the light 91 of 780 nm, which is in a near-infrared region causing no photoisomerization reaction in CMTA, was moved close to the surface of the polymer alloy 31, and the surface of the polymer alloy 31 was observed by detecting a transmitted light using the detector 71. As a result, an image of the domain 46 was observed. This means that due to the photoisomerization of CMTE from the open ring structure to the closed ring structure, the difference in refractive index between the domain 46 and the domain 51 composed of polyphenyl-methacrylate became 0.15, to form core and clad structures in the light waveguide, and the light from the probe was propagated through the domain 46 serving as the core structure to allow the domain 46 to be observed. Further, CMTE was photoisomerized from the closed ring structure to the open ring structure by selectively emitting an Ar laser light 91 of 488 nm wavelength from the front end of the near-field optical microscope probe 61 to the domain 46. The near-field optical microscope probe 61 received the light 91 of 780 nm, in a near-infrared region was moved close to the surface of the polymer alloy 31, and the entire surface of the polymer alloy 31 including the domain 46 was observed by detecting a transmitted light using the detector 71. As a result, no core/clad structure was created in the light waveguide, and no light was propagated through the domain 46, resulting in no image of the domain 46. Thus, it was proved that according to the method in this example, the polymer alloy 31 can function to record, reproduce and erase information by utilizing the change in refractive index of the phase-separated domain composed of polybenzyl-methacrylate having CMTE dispersed therein at a high concentration.

As mentioned above, the present invention can provide an optical recording medium capable of allowing high-density multiplex-wavelength recording/reading/erasing operations to be performed in a photon mode without complicated process.

According to the present invention, when a polymer alloy is particularly used as a composition of a surface layer to be applied to a substrate, the sizes (10 to 100 nm) of and the intervals between phase-separated domains of the polymer alloy can be controlled by adjusting the molecular weight and molecular weight ratio of a block copolymer or graft copolymer. Thus, functional organic compound molecules can be selectively infiltrated into only a specific phase-separated domain of the polymer alloy at a high concentration to provide enhanced accuracy in recording and reading, and a high-density optical recording media excellent in mechanical strength, durability and stability.

What is claimed is:

1. An optical recording medium having a surface layer provided on a substrate, the surface layer serving as a recording layer, and comprises a composition containing a polymer composed of a block copolymer or a graft copolymer with a phase-separated structure of two or more kinds of phase-insoluble polymer components each having a size of 10 to 100 nm, the optical recording medium, comprising:

phase-separated domains including one or more kinds of specific volatile substances dispersed therein in a one-to-one correspondence with each other, said specific volatile substances being formed by homogeneously depositing said specific volatile substances in a vapor state on the respective surfaces of said specific phase-separated domains in a one-to-one correspondence with each other, and dispersing and penetrating molecules of said deposited specific volatile substances into said corresponding specific phase-separated domains in a state in which the recording layer is disposed in a closed container capable of controlling a pressure and temperature thereof, with the upper limit of the temperature in the closed container being a melting point of a volatile substance and the pressure in the container at a temperature no greater than the upper limit temperature being less than or equal to the saturated vapor pressure of the volatile substance; and matrix composed of polymer components of the specific phase-separated domains and phase-insoluble polymer components and being other phase-separated domains which do not contain the volatile substance, wherein said specific phase-separated domain constitutes a basic unit for optical recording, said volatile substance is a photochromic compound capable of photoisomerization, and the difference in refractive index between the specific phase-separated domain having the photochromic compound penetrated and dispersed therein and the matrix is in the range of 0 to 0.02 in one isomerization state and is 0.06 or greater in the other isomerization state.

2. The optical recording medium as defined in claim 1, wherein said surface layer is a thin film having a thickness of about 20 to 500 nm.

3. A method of recording, reading and erasing information on the optical recording medium as defined in claim 1 or 2, wherein said information is recorded, read and erased by irradiating said recording medium with a near-field light.

4. A method of recording, reading and erasing information on the optical recording medium as defined in claim 1 or 2, wherein said volatile substance has at least one of a light transmittance, a light reflectance and a refractive index and a dipole moment which are changed in response to the irradiation of a light selected from the group consisting of an ultraviolet light, a visible light and a near-infrared light, wherein said information is recorded, read and erased by irradiating said recording medium with said light, in an photochemical process including no thermal effect.

5. A method of producing an optical recording medium, comprising the steps of:

forming a surface layer on a substrate, the surface layer serving as a recording layer and comprises a composition containing a polymer composed of a block copolymer or a graft copolymer with a phase-separated structure of two or more kinds of phase-insoluble polymer components each having a size of 10 to 100 nm;

homogeneously depositing one or more kinds of specific volatile substances in a vapor state on the respective surfaces of one or more kinds of specific phase-separated domains in said phase-separated structure, in a one-to-one correspondence with each other in a state in which the recording layer is disposed in a closed container capable of controlling a pressure and temperature thereof, with the upper limit of the temperature in the closed container being a melting point of a volatile substance and the pressure in the container at a temperature no greater than the upper limit temperature being less than or equal to the saturated vapor pressure of the volatile substance, and also forming matrix composed of polymer components of the specific phase-separated domains and phase-insoluble polymer components and being other phase-separated domains which the volatile substance does not enter;

dispersing and penetrating molecules of said deposited specific volatile substances into said corresponding specific phase-separated domains; and allowing said specific phase-separated domains and said corresponding specific volatile substances to chemically interact with each other, wherein said volatile substance is a photochromic compound capable of photoisomerization, and the difference in refractive index between the specific phase-separated domain having the photochromic compound penetrated and dispersed therein and the matrix is in the range of 0 to 0.02 in one isomerization state and is 0.06 or greater in the other isomerization state.

6. An apparatus for recording, reading and erasing information comprising:

a substrate;

an optical recording medium formed as a thin layer on the substrate, the optical recording medium comprising a block copolymer or a graft copolymer with a phase-separated matrix of two or more kinds of phase-insoluble polymer components that form two or more phase-separated domains each having a size of 10 to 100 nm, and at least one photochromic compound capable of photoisomerization, the photochromic compound being homogenously dispersed within one of the domains by exposing the phase-separated polymers to the photochromic compound while in a vapor state and under predetermined conditions;

an electrode layer formed between the substrate and the optical recording medium;

a light source capable of providing a first and second light, the first light having a wavelength that photoisomerizes the photochromic compound from a closed structure to an open structure thereby recording information and the second light having a wavelength that photoisomerizes the photochromic compound from the open structure to the closed structure thereby erasing information;

a power source connected between the electrode layer and the electrode of the probe; and a surface potential probe having an electrode formed on an outer peripheral surface disposed proximate to the optical recording medium for measuring changes in potential in the optical recording medium, thereby reading the information stored on the optical recording medium.

* * * * *